United States Patent [19]

Mizuhara

[11] 4,447,391

[45] May 8, 1984

[54] BRAZING ALLOY CONTAINING REACTIVE METALS, PRECIOUS METALS, BORON AND NICKEL

[75] Inventor: Howard Mizuhara, Hillsborough, Calif.

[73] Assignee: GTE Products Corporation, Stamford, Conn.

[21] Appl. No.: 448,582

[22] Filed: Dec. 10, 1982

[51] Int. Cl.³ .......................... C21C 5/02; C21C 5/04; C21C 19/03
[52] U.S. Cl. ..................................... 420/456; 420/463; 420/508; 420/512; 420/580; 228/263.11; 228/263.13; 228/263.18
[58] Field of Search ............... 420/444, 463, 508, 512, 420/580, 588, 456, 441; 428/606; 228/263.11, 263.12, 263.13, 263.18, 263.19, 263.21

[56] References Cited

U.S. PATENT DOCUMENTS

| | | | |
|---|---|---|---|
| 4,149,881 | 4/1979 | D'Silva | 420/444 |
| 4,261,742 | 4/1981 | Coupland et al. | 420/444 |
| 4,405,391 | 9/1983 | DeCristofaro | 428/606 |

FOREIGN PATENT DOCUMENTS 666511  7/1963  Canada ................ 420/463

Primary Examiner—L. Dewayne Rutledge
Assistant Examiner—Robert L. McDowell
Attorney, Agent, or Firm—Donald R. Castle

[57] ABSTRACT

Brazing alloys containing specified amounts of a reactive metal, specified amounts of boron, specified amount of gold, palladium and mixtures thereof and specified amounts of nickel, are ductile, have relatively low melting points. Chromium and silicon are optional metals which can also be utilized in this invention.

6 Claims, No Drawings

BRAZING ALLOY CONTAINING REACTIVE METALS, PRECIOUS METALS, BORON AND NICKEL

FIELD OF THE INVENTION

This invention relates to brazing alloys. More particularly it relates to active brazing alloys.

BACKGROUND

Alloys containing titanium are known. These alloys contain relatively high levels of titanium. Generally the titanium content is above about 7% by weight. These alloys are not ductile and can not be rolled to a foil in a satisfactory manner and upon brazing contains a brittle dispersed phase is present. Boron containing alloys are also hard and cannot be rolled easily however on melting. Boron can diffuse away from the joint resulting in a higher melting point alloy and increase in ductility.

SUMMARY OF THE INVENTION

Brazing alloys containing specified amounts of a reactive metal, specified amounts of boron, specified amount of gold, palladium and mixtures thereof and specified amounts of nickel, have relatively low melting points and can braze difficult to wet material. Chromium and silicon are optional metals which can also be utilized in this invention.

DETAILS OF PREFERRED EMBODIMENTS

For a better understanding of the present invention, together with other and further objects, advantages and capabilities thereof, reference is made to the following disclosure and appended claims in connection with the above description of some of the aspects of the invention.

The amount of the reactive metal in the alloys of this invention cannot appreciably exceed about 5% by weight and achieve a ductile material which upon brazing is free of dispersed phases. By reactive metal, within the context of this disclosure, is meant titanium, zirconium, vanadium and mixtures thereof.

The amount of reactive metal utilized in the alloys of this invention is from about 0.10% by weight to about 5% by weight, with from about 2% by weight to about 3.5% by weight being preferred. While titanium is the especially preferred reactive metal, alloys containing Ti-Zr and Ti-V mixture are also very effective thus are considered the preferred reactive metals.

The weight percent of nickel can vary from about 15% by weight to about 85% by weight, however, when gold or gold and palladium mixtures are utilized as the precious metal, the preferred range for nickel is from about 15% by weight to about 40% by weight. In these cases where the precious metal is gold or mixtures of gold and palladium, the precious metal is the balance and is present in amounts of from about 51% by weight to about 83% by weight.

Chromium is an optional metal which can be added to the alloys of this invention to improve corrosion and oxidation resistance. For this purpose, chromium is added in an amount from about 0% by weight to about 30% by weight and preferably from about 5% to about 15% by weight.

Boron is utilized in amounts of from about 0.05% by weight to about 4% by weight. The boron alloys with either the nickel or palladium. These alloys reduce the melting point thereby enabling brazing to occur at a much lower temperature than without the boron addition. Due to the small atomic size of boron, it can diffuse away from the brazed joint rapidly at the brazing temperature thereby increasing the joint ductility and the joint remelt temperature. Silicon in amounts of up to about 4% by weight is a useful additive as a melting temperature depressant to some alloys of this invention, particularly to those palladium alloys having a relatively low palladium content.

The balance of the alloys of this invention are precious metals selected from the group consisting of gold, palladium and mixtures thereof and are present in amount of from about 5% by weight to about 85% by weight.

In order to more fully illustrate the preferred embodiments of the subject invention the following detailed examples are presented, all parts, percentages and proportion are by weight unless otherwise stated.

Various alloys are prepared by skull melting using a tungsten electrode and an argon atmosphere. The alloys are ductile and are rolled, to foils using an intermediate vacuum anneal. The thickness of the foil is of from about 2 to 6 mils.

EXAMPLE 1

| Au | Pd | Ni | Ti | B | Flow Temperature |
|----|----|----|----|----|------|
| 30% | 34% | 36% | | | 1180° C. |
| 28% | 34% | 36% | 1% | 1% | 1050° C. |

An alloy of gold, palladium and nickel with a flow temperature of 1180° C. can be used to braze at 1050° C. by an addition of about 1% boron and about 1% titanium to the alloy. A "T" joint is made from ¾"×1"×0.050" thickness Inconel 718 material. A powder of about 28 Au, 34 Pd, 36 Ni, 1% Ti, 1% B is made into paste with 1% Methocel J75 (a trademark of Dow Chemical Company) and applied at one side along ¼" section. The assembly is brazed in about 10⁻⁵ mm Hg vacuum at about 1050° C. temperature for about 10 minutes and furnaced cooled. The alloy produces excellent fillet over the joint length and shows an overall defect-free joint.

EXAMPLE 2

An alloy of about 60% Pd, about 40% Ni with a flow temperature of about 1250° C. has a degrading effect on Hastalloy X. An addition of about 2% titanium and about 2% boron yields an alloy having the approximate 58% Pd, 38% Ni, 2% Ti, 2% B. The flow temperature of this later alloy is reduced to about 990° C. A brazed joint using a powder with the latter composition on a "T" joint made from ¾" ×1"×0.050" thickness Hastalloy X. A brazing alloy paste from the latter composition is placed on one side along a ¼" section. A braze is made at about 990° C. temperature under about 10⁻⁵ mm Hg vacuum and cooled. An excellent bond is made as tested by bending the "T" in a vice.

EXAMPLE 3

An alloy of the following approximate 10% Pd, 80% Ni, 10% Cr melts at about 1340° C., however by an addition of about 3% silicon, 2% titanium and 3% boron substituted for the equal weight percent of nickel, the liquidus temperature is reduced to 995° C. An alloy with following composition is prepared and crushed into particles less than about 100 microns.

10% Pd, 72% Ni, 10% Cr, 3% Si, 2% Ti, 3% B.

The paste is made from above powder and Methocel solution and is applied along a ¼" end section on one side of a "T" specimen made from 1"×¾"×0.050" thickness Hastalloy X.

The alloy is brazed at about 1025° C. temperature under about $10^{-5}$ mm Hg vacuum with about a about 30 minutes hold period at the braze temperature and cooled.

The joint is sound as shown by bending the "T" joint in a vice.

EXAMPLE 4

Compositions of several alloys and their liquidus temperatures are given in Table 1.

TABLE 1

| Alloy | Au | Pd | Ni | Cr | Si | Ti | B | Liquidus Temperature °C. |
|---|---|---|---|---|---|---|---|---|
| 1 | 30 | 34 | 36 | | | | | 1169° C. |
| 2 | 28 | 34 | 36 | | | 1 | 1 | 995° C. |
| 3 | 50 | 25 | 25 | | | | | 1121° C. |
| 4 | 48 | 25 | 25 | | | 1 | 1 | 1025° C. |
| 5 | 70 | 8 | 22 | | | | | 1037° C. |
| 6 | 68 | 8 | 22 | | | 1 | 1 | 1005° C. |
| 7 | 37 | 25 | 33 | | 5 | | | 1140° C. |
| 8 | 38 | 25 | 30 | | 5 | 1 | 1 | 1025° C. |
| 9 | 82 | | 18 | | | | | 950° C. |
| 10 | 80.5 | | 18 | | | 1 | 0.5 | 960° C. |
| 11 | | 60 | 40 | | | | | 1238° C. |
| 12 | | 58 | 38 | | | 2 | 2 | 930° C. |
| 13 | | 10 | 80 | 10 | | | | 1340° C. |
| 14 | | 10 | 72 | 10 | 3 | 2 | 3 | 995° C. |
| 15 | | 25 | 65 | 10 | | | | 1270° C. |
| 16 | | 25 | 62 | 10 | | 2 | 1 | 995° C. |
| 17 | | 45 | 45 | 10 | | | | 1235° C. |
| 18 | | 45 | 41 | 10 | | 2 | 2 | 945° C. |

Alloys 1, 3, 5, 7, 9, 11, 13, 15 and 17 are all commercial alloys currently produced by the WESGO division of GTE Products Corporation.

What is claimed is:

1. A brazing alloy consisting essentially of from about 0.1% by weight to about 5% by weight of a reactive metal selected from the group consisting of titanium, zirconium, vanadium and mixtures thereof, from about 0.05% by weight to about 4% by weight of boron, from about 15% by weight to about 85% by weight of nickel, from about 0% to about 30% by weight chromium, balance a precious metal selected from the group consisting of gold, palladium and mixtures thereof, said precious metal being present in amounts of from about 5% by weight to about 85% by weight.

2. An alloy according to claim 1 wherein said reactive metal is titanium.

3. An alloy according to claim 2 wherein said precious metal is gold or mixtures of gold and palladium and is present in amounts of from about 51% by weight to about 83% by weight and nickel is present in amounts of from about 15% by weight to about 40% by weight.

4. An alloy according to claim 2 wherein said precious metal is palladium and is present in amounts of from about 5% by weight to about 65% by weight and said nickel is present in amounts is present in amounts of from about 25% by weight to about 85% by weight.

5. An alloy according to claim 4 wherein silicon is present in amounts of up to 4% by weight.

6. An alloy according to claim 1 wherein said precious metal is gold.

* * * * *